May 1, 1928. 1,668,420
L. C. ROWLAND ET AL
HEATING RADIATOR FOR AUTOMOBILES
Filed May 23, 1927
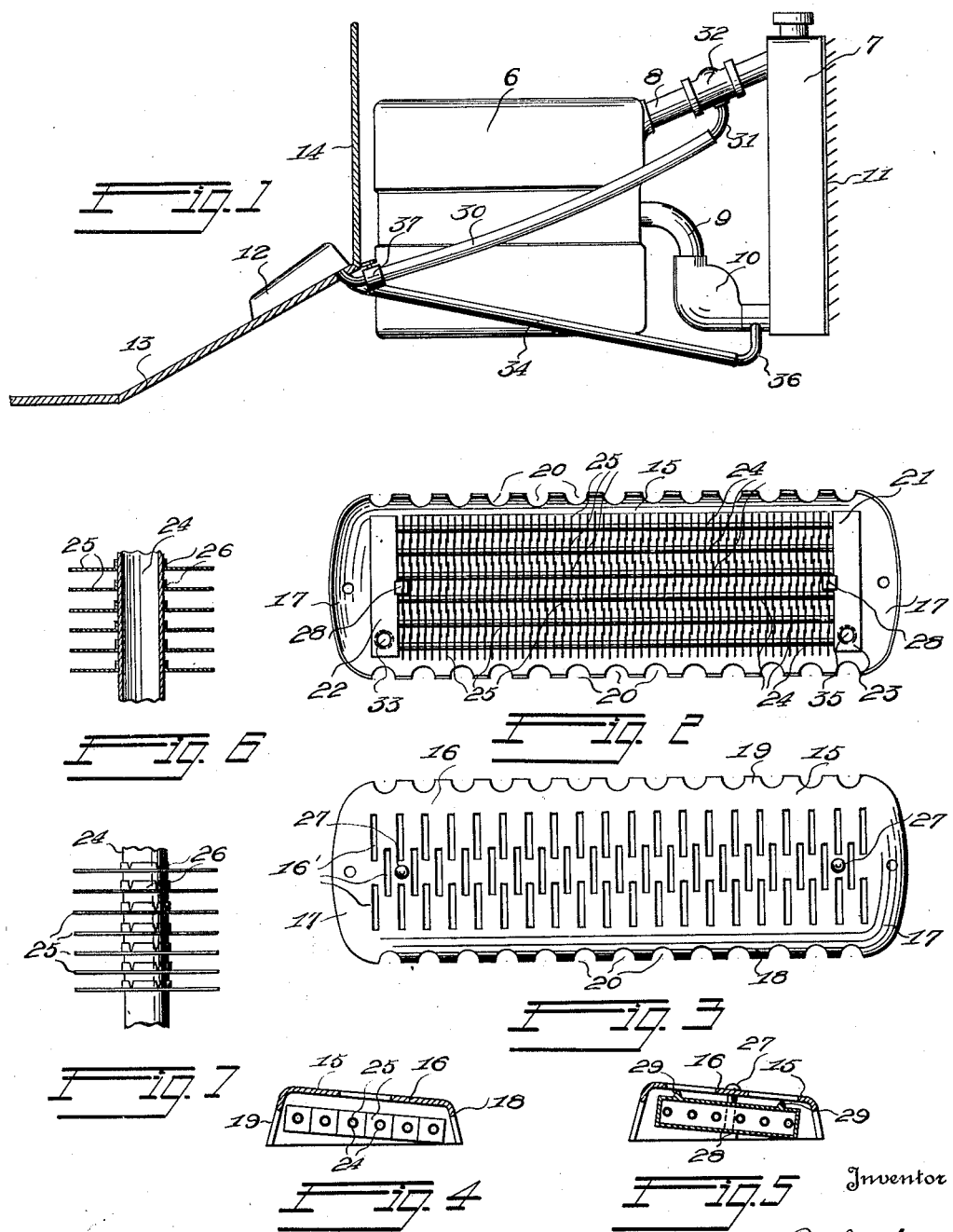

Patented May 1, 1928.

1,668,420

UNITED STATES PATENT OFFICE.

LEWIS C. ROWLAND, OF HERKIMER, AND CARL W. RUNDLETT, OF JACKSON HEIGHTS, NEW YORK, ASSIGNORS TO MOT-ACS, INCORPORATED, OF NEW YORK, N. Y., A CORPORATION OF DELAWARE.

HEATING RADIATOR FOR AUTOMOBILES.

Application filed May 23, 1927. Serial No. 193,575.

This invention relates to an automobile heater of the type that uses the water of the circulatory system, ordinarily provided to maintain the engine at proper temperatures, to heat the car, and a novel heating system for a motor vehicle.

It has been found in the practical application of heaters designed to use the water of the engine cooling system of an automobile that it is essential that only a restricted or limited quantity of water be taken from that system in order to avoid interference with the proper cooling of the engine and the temperature of the water must not be raised to the point where serious loss of anti-freezing fluids by boiling will occur. It is entirely practical to utilize a restricted quantity, less than 20% of the water in the entire system to heat the interior of the body of the car. If a greater proportion of the water is taken from the system the efficiency of the cooling system is seriously affected. A practical automobile heater accordingly must be of a type that will radiate the maximum quantity of heat from a very limited quantity of available heated water.

Systems have heretofore been proposed in which only a restricted quantity of water diverted from the cooling system has been used to heat the interior of the car, but these systems have not been entirely satisfactory because sufficient heating of the car could not be effected in comparatively cold weather with a water temperature suitable for satisfactory engine operation and below the boiling temperature of a binary mixture of alcohol and water. For satisfactory operation in winter where an alcohol anti-freezing mixture is utilized the water temperatures should not exceed about 150° F. and the water temperatures encountered in practice are usually from 100° to 140° F. in cold weather.

A primary object of this invention is to provide a heat radiating element for the interior of the car designed to radiate heat freely so that fluid temperatures in the cooling system of from 110° to 140° F. are sufficient to heat an automobile in a commercially satisfactory manner.

A further object of the invention is to provide a novel system of heating an automobile in which the maximum of radiation is secured from a minimum diversion of water permitting satisfactory heating to be secured in cold weather with temperatures below the boiling point of a binary mixture of alcohol and water.

A further object of the invention is to provide a heat radiating element for the interior of the car that is so arranged that a circulation of air is maintained across substantially all portions of the element.

A still further object of the invention is to provide a heat radiating element for the interior of the car that permits free circulation of the air in the car to substantially all parts of the radiating element, but which is at the same time encased in a manner that will not interfere with said circulation while substantially protecting the radiating element from injury by the occupants of the car.

Further objects of the invention will appear as the description thereof proceeds with reference to the accompanying drawings in which—

Figure 1 is a diagrammatic side elevation showing one embodiment of this invention.

Figure 2 is a plan view of the heat radiating element as viewed from the under side thereof.

Figure 3 is a top plan view of said element.

Figure 4 is a section taken centrally of the radiating member.

Figure 5 is a section through a header.

Figures 6 and 7 are a longitudinal section and elevation of a portion of one of the elements of the radiating member.

Similar reference characters indicate like parts throughout the several figures of the drawings.

In the drawings 6 indicates the engine of the automobile and 7 the radiator. The jacket of engine 6 is connected to the radiator 7 by conduits 8 and 9 in the latter of which a pump 10 is arranged. In well known manner pump 10 circulates the water between the engine and radiator to cool the engine. A suitable front 11 may be provided for the radiator, if desired. Said front may have manually or automatically operated shutters to control the temperature of the water in well known manner, as will be understood by persons skilled in this art.

In order to heat the interior of the car, a heat radiating element 12 is arranged within the body of the car, preferably a closed car. This element is preferably disposed on the floor 13 either in back of the dash 14 or elsewhere in the body of the car in position to receive the feet of an occupant of the car. As shown in Figure 1 said element is wholly above the top surface of the floor of the car for a purpose presently to be described.

A preferred form of heat radiating element 12 is shown in detail on an enlarged scale in Figures 2, 3, 4 and 5. It comprises an outer supporting and protecting casing 15, having a top surface 16 that is downwardly flanged on all its sides, the end flanges being indicated by numeral 17 and the side flanges by numerals 18 and 19. As clearly shown in Figures 1, 4 and 5 the front flange 18 is shorter than rear flange 19, and end flanges 17 are correspondingly formed, to cause the top surface of the casing to be inclined forwardly to constitute a convenient foot rest. It will, however, be understood that the flanges may be of equal length if desired. Openings of substantial size are formed in the flanges 18 and 19 as shown at 20 and may be formed in the end flanges 17 if desired.

The top surface 16 of casing 15 is provided with a multiplicity of openings 15', shown as rectangular openings arranged in staggered relation. It should be understood, however, that openings of other configuration may be made, the primary consideration being that comparatively free circulation of air through the casing may be permitted. As the temperature of the heating medium is low as compared to the temperatures utilized in prior proposed automobile heating systems, it is essential that the casing permits free circulation of the air, a requisite not required by the theory of operation of the prior automobile heating systems.

Supported beneath casing 15 is the radiating element proper designated as a whole by numeral 21. It comprises hollow prismoidal headers 22 and 23, connected together by a plurality of tubes 24 that are secured at their ends to the several headers, so that the water can circulate from one header to the other, and preferably so constructed that uniform circulation is obtained through each of the tubes. Each of the tubes has a plurality of heat radiating fins 25 secured thereto. As shown in Figure 4 the fins are preferably square in side elevation but may be any form desired. The fins are preferably sheet metal stampings provided with a central opening of less diameter than the external diameter of the tube 24. The metal adjacent the opening of each stamping is slit and bent at right angles to form an interrupted flange 26 that is soldered, welded or otherwise secured to tube 24. As shown on the drawings the tubes are provided with a multiplicity of these fins arranged close together but permitting free circulation between them.

The assembly of tubes, fins and headers is secured within casing 15 by bolts 27 and nuts 28, spacing ribs 29 of equal height being provided on the headers (see Figure 5) to space the assembly from the casing. As the top of the casing is inclined the assembly will be inclined, though a horizontally arranged top and assembly or an inclined top and horizontal assembly may be used, if desired.

Water from the circulatory engine cooling system is conducted to the heat radiating element 12 by means of a conduit 30 secured to a tubular extension 31 of connection 32 in conduit 8 of the circulatory system, or if desired to a connection tapped into the engine jacket or head at any suitable point for the withdrawal of hot water. Conduit 30 is connected to the walls of threaded opening 33 in heater 22 (see Figure 2). A return conduit 34 connected to header 23 to 35 is coupled with conduit 9 of the engine cooling system adjacent pump 10 by a connection 36 or if desired to the return leg of a suitable diverter connection (not shown) of the type shown in Patent #1,575,- 667. The arrangement and size of the conduits that furnish the heat radiating element with water, and their resistance, compared to the resistance of the cooling system are such that only a restricted quantity, less than 20% of the water capacity of the cooling system of the car when valve 37 is open. The water capacity of the entire system designed to heat the car body is small, preferably about two quarts, and it is essential that tubes, headers, and conduits be selected to maintain a ratio between the capacity of the cooling system to the capacity of the heating system of about, or less than, 3 or 4 to 1.

In operation, when the valve 37 is opened water will be caused to flow in restricted or limited quantity from connection 32 through extension 31, conduit 30, header 22, tubes 24, header 23, conduit 34, and connection 36 back to the engine cooling system, pump 10 causing a circulation through the radiating element within the car in proportion to the resistance offered by said element and its conduits as compared to the resistance in the cooling system. Hot or warm water is accordingly circulated through said element, and heat radiating fins 25 are arranged on tubes 24.

The cold air in the car adjacent the floor of the car and within casing 15 is heated and accordingly rises through openings 16' in casing 15, thus inducing a natural circulation through the heat radiating element 21 that continues while said radiating element is heated, due to the fact that the cold air settles to the floor of the car and that adjacent the radiating element is drawn through said element by the circulation induced within the casing by the heating of the air. It will be observed that the radiating element is inclined to the horizontal. The air passing upward therethrough is accordingly compelled to follow a longer course in traversing the radiating element than the height of the element measured normal to its supporting surface, thus increasing the heating effect since the temperature of the air passing through the cellular structure formed by fins 25 and tubes 24 is raised in direct proportion to the time the air is subjected to the heating of the element.

It will thus be seen that an automobile heating system is provided embodying means to positively force a restricted or limited quantity of the water of the engine cooling system through a radiating element located within the car, and that means are provided whereby the heat in the water is absorbed by a multiplicity of radiating fins arranged so that a circulation of the air within the car pass therethrough to secure a thoroughly effective heating of the car from a limited quantity of available water heated to temperatures below the boiling point of a binary mixture of alcohol and water. A heat radiating element is also provided of novel form including a cellular structure designed to provide with a protective casing a substantially unrestricted circulation of air through the radiating element which permits satisfactory heating of an automobile with water at a temperature of as low as 110° F. or less.

The invention has been above described in detail, though the invention does not reside in such detail. The scope thereof is to be determined from the following claims that are intended to include such range of equivalents as come fairly within the terms of said claims.

We claim as our invention—

1. An automobile heater comprising a cellular structure formed by a plurality of spaced substantially parallel conduits each provided with means to radiate heat from water passing through said conduits, and a surrounding casing provided with a plurality of air circulation openings so arranged that air is free to flow through some of said openings, through said cellular structure and through other of said openings in succession.

2. An automobile heater comprising a perforated top, and supporting side members arranged to support said top in spaced relation to the floor of the automobile, said side members being provided with air circulating openings, a heat radiating member supported by said casing beneath said top, said heat radiating member including a plurality of water conducting channels extending lengthwise thereof, and spaced laterally of each other, webs arranged in the spaces between said channels and secured to said channels to radiate the heat from said channels laterally thereof, said webs being spaced bodily from each other endwise of the channels to provide relatively free circulation of air therebetween from said openings in said supporting members between said webs, around said channels and through said perforated top.

3. An automobile heater comprising a casing having a perforated top and supporting members projecting downwardly from said top, said supporting members being formed to engage the floor of an automobile body at spaced points so that air can circulate beneath said supporting members, a heat radiating element arranged within said casing and supported thereby in spaced relation to said floor, said heat radiating element comprising a plurality of tubular channels extending longitudinally of said casing beneath said top, heat radiating webs secured to said channels and extending across the space between said channels, said webs being bodily laterally spaced from each other to provide air circulating spaces therebetween, means to supply heated water to said channels adjacent one end of said casing, and means arranged adjacent the other end of said casing to conduct the water away from said channels.

In testimony whereof we affix our signatures.

LEWIS C. ROWLAND.
C. W. RUNDLETT.